United States Patent [19]

Benning

[11] Patent Number: 4,760,885
[45] Date of Patent: * Aug. 2, 1988

[54] RACING-TYPE HORSESHOE

[76] Inventor: James M. Benning, 1857 Tilton Dr., Pittsburgh, Pa. 15241

[*] Notice: The portion of the term of this patent subsequent to Feb. 24, 2004 has been disclaimed.

[21] Appl. No.: 917,171

[22] Filed: Oct. 15, 1986

Related U.S. Application Data

[63] Continuation-in-part of Ser. No. 735,523, May 20, 1985, Pat. No. 4,645,008.

[51] Int. Cl.4 .............................................. A01L 1/04
[52] U.S. Cl. ..................................................... 168/11
[58] Field of Search ..................... 168/11, 12, 13, 25, 168/28

[56] References Cited

U.S. PATENT DOCUMENTS

| 28,656 | 6/1860 | Coleman | 168/12 |
| 209,421 | 10/1878 | Reynolds | 168/25 |
| 726,904 | 5/1903 | Giles | 168/13 |
| 737,845 | 9/1903 | Jackson | 168/13 |
| 1,147,796 | 7/1915 | Eyman | 168/11 |
| 1,953,281 | 4/1934 | Veran | 168/13 |

*Primary Examiner*—Robert P. Swiatek

[57] ABSTRACT

A racing-type horseshoe having a metal shoe plate for nailing to a horse's hoof and a ground contacting base plate adapted for affixation to the sole plate by threaded fasteners which permit quick and easy replacement of the base plate.

15 Claims, 2 Drawing Sheets

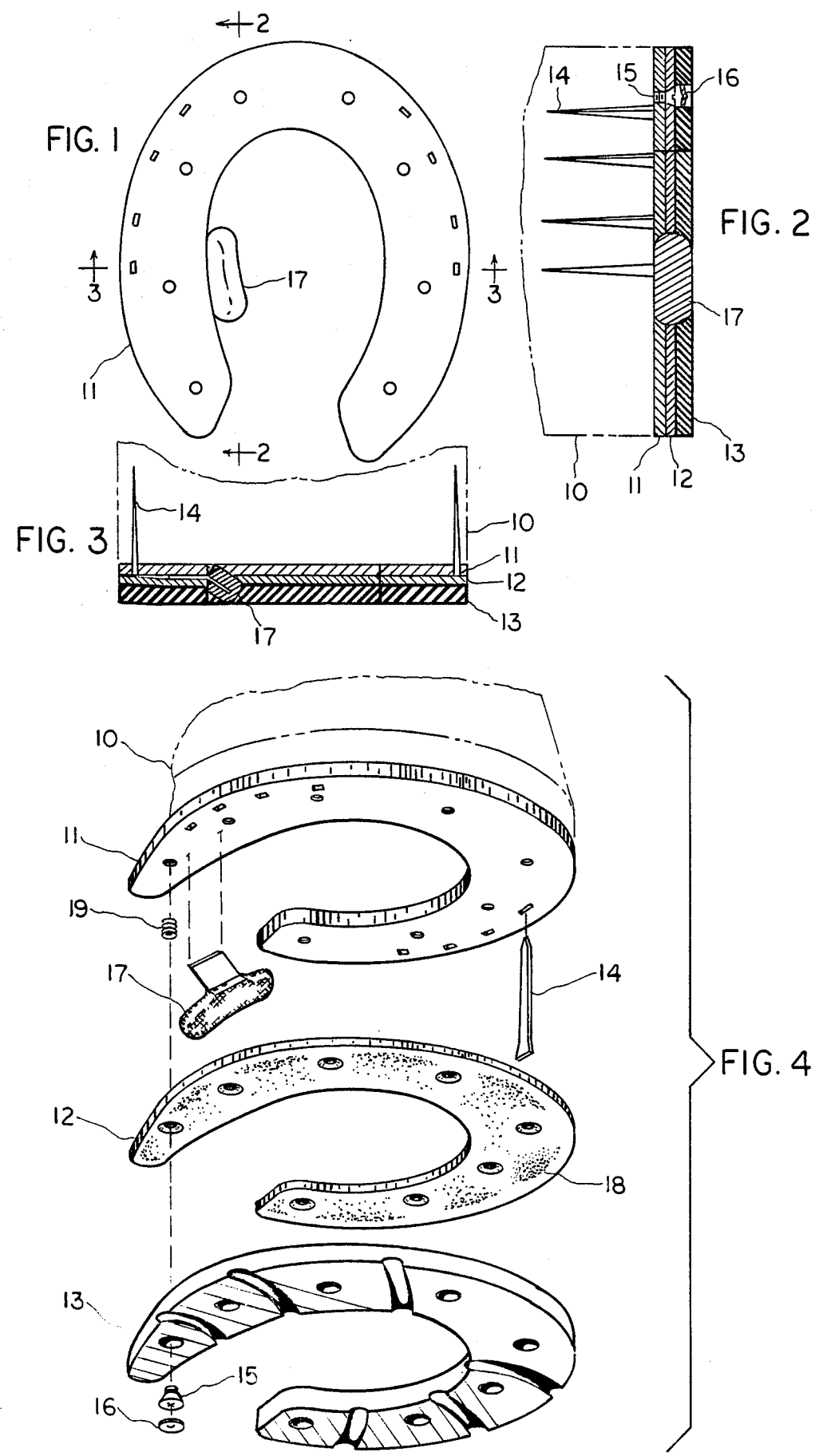

RACING-TYPE HORSESHOE

CROSS-REFERENCE TO RELATED APPLICATION

This application is a continuation-in-part of Ser. No 735,523, filed May 20, 1985 and now U.S. Pat. No. 4,654,008.

BACKGROUND OF THE DISCLOSURE

The present invention relates generally to the field of racing horseshoes, and more particularly to a type of horseshoe which will absorb most impact shock, significantly improve footing, and allow for fine balance adjustments, while permitting the ground contact surface to be changed without the service of a blacksmith.

Prior workers in the art of horseshoes have expended much effort trying to find a horseshoe for competition horses that would provide for sure footing on wet, dry, deep or hard racing surfaces. The addition of a swedge groove or various calks and grabs to the shoe have reduced the amount of slipping, but these modifications can have serious side effects. The competition horse will often experience ankle and knee soreness as well as tendon and ligament injuries. These conditions of lameness are a result of the unnatural pull forces that are generated by these traction devices while the horse is jogging, training or racing.

Another area that has received much attention is the development of a horseshoe that will absorb the tremendous impact forces realized by the horse's legs while engaged in competition or while training so as to be fit for competition. This effort is well demonstrated in U.S. Pat. Nos. 3,490,536 and 3,907,036. Although each of the shoes disclosed in these two patents would aid in reducing impact forces, neither shoe would permit changing of the ground contact surface, without adding additional nail or screw holes to the horse's hoof wall. Thus, each new hole added to the horse's hoof would further weaken the hoof wall and often lead to quarter cracks in the hoof and subsequent lameness.

SUMMARY OF THE INVENTION

The present invention relates generally to the field of racing-type horseshoes and, more particularly, to a multiple piece horseshoe assembly which will permit numerous adjustments to be made to any of the horse's hooves, with no adverse effect to any hoof wall. This present invention will alleviate almost all of the restrictions now realized by horse trainers, while using the latest state of the art in horseshoes. This invention consists of two primary plates, an upper plate and a lower plate that is really a combination plate. The upper plate or sole plate is attached to the horse's hoof in the conventional manner. This sole plate can be made in the standard open design or a bar shoe design which will give added support to the frog and navicular bone. The blacksmith will trim the horse's hoof to obtain the desired toe length, then file the hoof to the desired degree or angle of slope required for that particular hoof. The sole plate is then affixed to the horse's hoof by using a modified horseshoe nail that will enable the nail head to be countersunk into the sole plate.

The sole plate may be made of a variety of materials including ferrous or non-ferrous metal, polymers, plastics, graphites, carbon fiber in resin base and the like. This plate will have a plurality of threaded holes as well as acceptance holes for the horseshoe nails. In the case of non-metal sole plates, threaded metal inserts may be used instead of threading the material from which the sole plate is made. However, metal inserts may not be required for some of the newer high strength materials.

The blacksmith will not be permitted to pinch or bend the sole plate to obtain the desired fit on the hoof. The horseshoe assembly of this invention is produced in a complete sizing order and distortion of this sole plate will destroy the primary objective of the quick change capability of the horseshoe assembly. The blacksmith will choose the size sole plate that fits the hoof or the next larger size sole plate. Any overhang of material will easily be removed by a rasp or file. The lower plate or ground contact plate will then be attached to the sole plate by the use of threaded fasteners.

As previously stated, the lower plate is a combination plate. This plate is a ferrous or non-ferrous support plate that has had an elastomeric material bonded to it. The use of a structural adhesive or vulcanization can be used to bond the elastomeric material to the support plate. The threaded fasteners that are used to attach the lower plate to the upper plate will be countersunk into the rubber, so as not to make contact with the ground at any time. In the event of poor track conditions, a ground contact surface will be available with steel studs extending through the rubber base plate. These steel studs may be necessary when the racing surface is frozen or nearly frozen. The combination of a treaded rubber ground contact surface and the steel studs should afford the horse good footing during these adverse conditions. The use of this rubber as a ground contact surface will aid in absorbing almost all of the impact shock that would have previously had a deteriorating effect on all of the horse's leg joints and tendons. This elastomeric material is intended to be the ground contact surface for almost all conditions with many possible combinations available to the horseman in a matter of minutes. When a stiff toe or toe grab is required, this is made possible by using a three piece ground contact surface in place of the lower plate or support plate (see FIG. 6). Each side rail of the assembly will have rubber contacting the ground, and the toe plate will have metal contacting the ground. This metal section can be a swedge groove type plate or have a vertical grab of the desired length. This will permit the horse to have the desired amount of toe grab for any race course, while still affording the primary objective of this horseshoe. The weight bearing and landing area of the hoof will have a cushion and shock absorbing quality, and as the hoof breaks over or unloads, the toe grab will permit maximum power off for acceleration.

The stride of any horse can be improved by increasing or decreasing the traction available from this ground contact surface. With the trainer having the ability to change this ground contact plate, the horse can be assured of sure footing on any racing surface and should perform with confidence as well as to its utmost ability. This invention will give the trainer a tremendous latitude to choose the best ground contact surface for any hoof at any time. Prior to this invention, the horse was limited to the same ground contact surface for jogging, training and racing, unless a blacksmith was appointed to change the horseshoes. It must be remembered that prior to this invention, a limited number of shoe changes would be available to the trainer in any thirty day period. Each shoe change would require adding new holes to the hoof wall and further weaken the integrity of that hoof. With the present invention, hundreds of changes are available to the trainer with no detrimental effect to the horse.

Another objective of this invention is to permit the fine balancing of the horse's hooves. The construction of this horseshoe assembly requires the lower plate to be fastened to the sole plate with the use of threaded fasteners. This design permits the adding of specially designed lead weights to any position of this horseshoe with no holes being added to the horse's hoofwall. This weight can be added by the use of a specially designed spring steel tang being placed between the sole plate and ground contact plate. This spring steel tang will have lead molded to it and will be available in one-half to three ounce units. This weight can be positioned at any location on the underside of the horseshoe. The weights are positioned far enough above the ground so as not to wear or be damaged by impacting the ground. It is therefore very easy to add weight to the outside or inside of the hoof. Previously, to add weight to the hoof, it was necessary to screw weights to the outside of the hoof or have a blacksmith make special weighted horseshoes. Each of these choices would require adding more holes to the hoof wall.

The objective of this present invention is to make available to performance horse trainers a horseshoe that will permit the changing of the cushioned ground contact surface in a matter of minutes while using conventional tools. This horseshoe will allow the trainer to adjust the horse's footing for environmental changes to the race course. This horseshoe will absorb almost all of the impact shock to the hoof and leg while assuring the horse firm footing and eliminating slipping that so often ends a racing career. Another objective is to permit the balancing of the hoof in flight by using specially designed weights. These weights can make the hoof perform in a very desirable way so as to let the horse perform to its potential.

Further scope of applicability of the present invention to other areas will become apparent from the detailed description to follow taken in conjunction with the accompanying drawings.

BRIEF DESCRIPTION OF THE DRAWINGS

FIG. 1 is a top plan view of the quick-change horseshoe in accordance with the present invention.

FIG. 2 is a cross-sectional view taken along line 2—2 in FIG. 1.

FIG. 3 is a cross-sectional view taken along line 3—3 in FIG. 1.

FIG. 4 is an exploded view of the quick-change horseshoe of FIG. 1.

DETAILED DESCRIPTION OF THE PREFERRED EMBODIMENT

Figure 5:
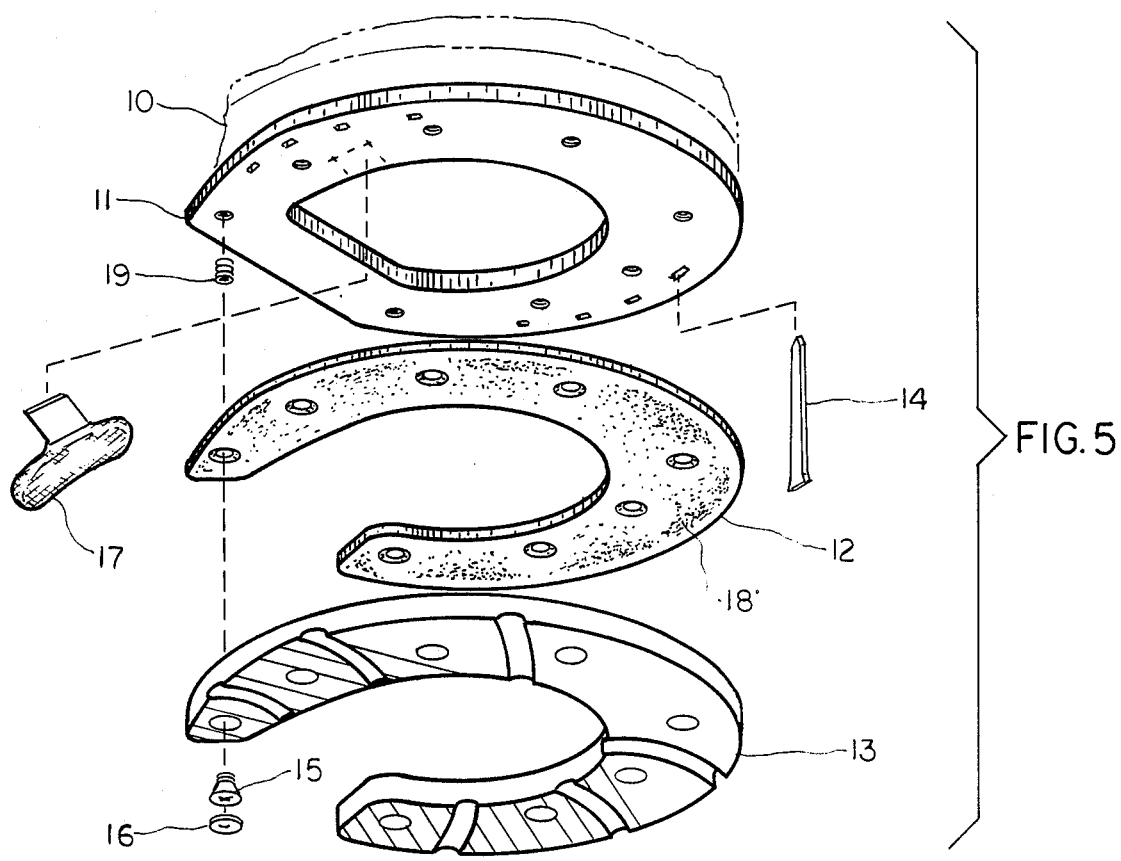
FIG. 5 is a view of the horseshoe assembly with the sole plate being of a bar shoe design.

All reference in the following description of the quick-change horseshoes are intended to refer to the specific model of my invention chosen for the drawing and are not intended to limit the scope of my invention.

In FIG. 1 of the drawing, I show a top view of the quick-change horseshoe; from this perspective only the sole plate or upper plate 11 is visible. In FIG. 2, the components of my invention become more distinguishable. The horse's hoof 10 is shown in phantom and the sole plate 11 is affixed to the hoof 10 by use of modified horseshoe nails 14 with the heads of the nails countersunk into the sole plate 11. The sole plate 11 may have a roughened upper surface for contacting a horse's hoof to help grip the hoof and reduce stress on the nails used to secure the plate to the hoof. The lower plate 12 or quick-change portion of the shoe is shown with threaded fasteners 15 securing the lower support plate 12 to the sole plate 11 in FIG. 4. I show all of the components of the quick-change horseshoe in a specific order of assembly. As previously stated regarding FIG. 2, the sole plate 11 is affixed to the hoof 10 (in phantom) by the modified horseshoe nail 14.

The drawing shows a ground contact plate 13 of elastomeric rubber of suitable quality with a very high tear and peel resistance. This ground contact plate 13 is preferably affixed to the lower plate, or quick-change plate, 12 by vulcanization or a structural adhesive 18. The support plate 12 with the contact plate 13 bonded or adhered thereto form a cuchioned base plate which may be attached to the sole plate 11 with screws 15.

The hoof balancing weight 17, as shown, can be positioned at any point on the inside rim of the horseshoe. The dust button 16 is installed over the head of the threaded fastener to aid in keeping the screw slots free of debris. An optional steel thread heli-coil 19 is shown as a usage extender for the sole plate. While the aluminum threads are good, the steel threads will last longer in the grit that this plate is exposed to.

Horseshoes of this invention are produced in graduated sizes to fit a variety of hoof sizes to avoid the need for a blacksmith to pinch or bend the sole plate 11 so as to achieve a fit to a horse's hoof. Any pinching or bending of the sole plate 11 would interfere with matching the screw holes in the sole plate and cushioned base plate and this would interfere with interchangeability or quick change of plates 12 and 13 in accordance with this invention.

Figure 6:
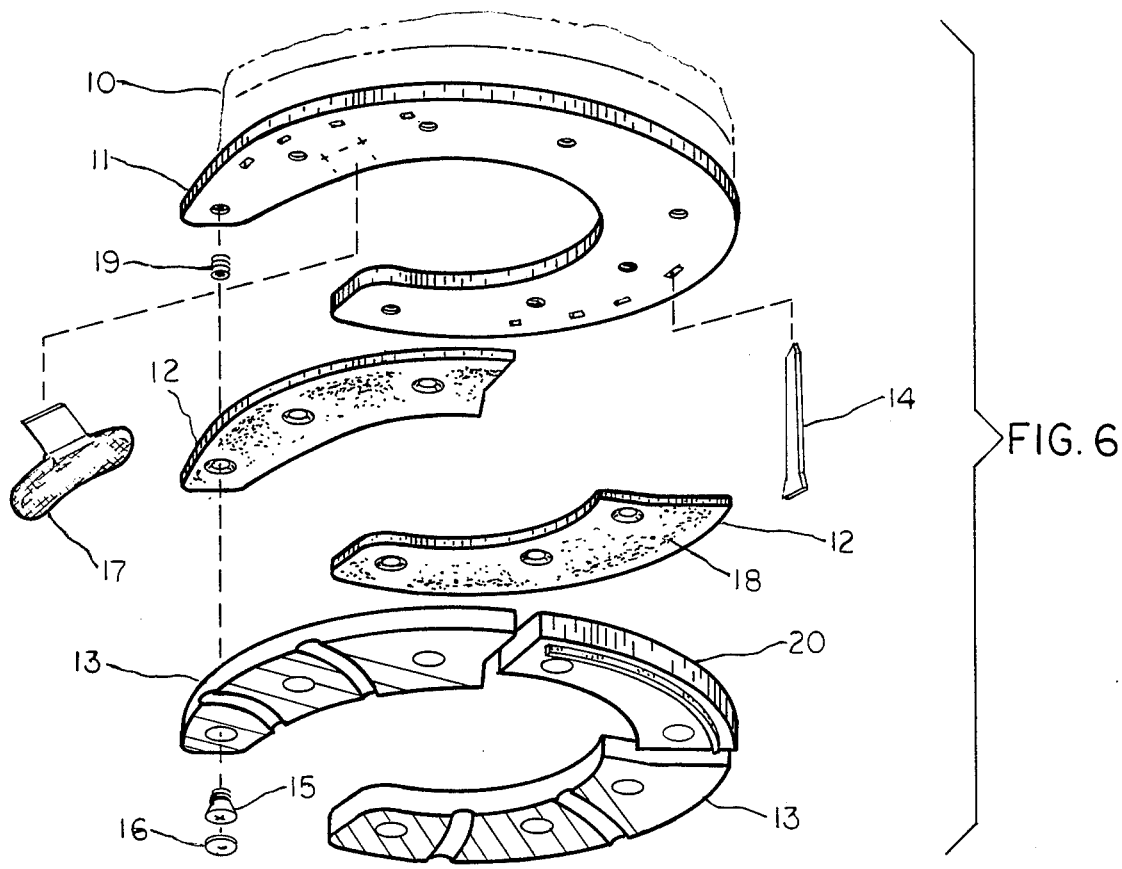
FIG. 6 is a view of a three piece ground contact surface.

In FIG. 5 the sole plate 11 is shown in a bar type design. In FIG. 6 a three piece ground contact surface is shown. The elastomeric side rails 13 and the metal toe grab 20 are made available to the horseman so as to cover all possible conditions.

While the invention has been described in terms of preferred embodiments, the claims appended hereto are intended to encompass all embodiments which fall within the spirit of the invention.

What is claimed is:

1. A horseshoe comprising a sole plate adapted to be affixed to a horse's hoof in contact with the hoof a cushioned base plate adapted to be attached to said sole plate for ground contacting purposes with said base plate comprising a support plate for attachment to said sole plate and an elastomeric ground plate bonded to said support plate, said sole plate having holes in it and said base plate having matching holes in it, and a plurality of threaded means for attaching said base plate to said sole plate after the sole plate is affixed to a horse's hoof and for quickly and easily removing and replacing said base plate with any of a variety of alternative base plates, said attachment of the base plate to the sole plate being entirely by securement of said support plate to said sole plate with said threaded means.

2. A horseshoe as set forth in claim 1 in which the ground contacting portion of said base plate comprises an elastomeric rail on each side of the base plate and a metal toe grab.

3. A horseshoe as set forth in claim 1 which is adapted to receive leaded weights at any of the threaded fastener means to balance a horse's hoof.

4. A horseshoe as set forth in claim 1 in which dust caps cover the heads of the threaded fasteners.

5. A horesehoe as set forth in claim 1 in which said sole plate has holes in it for receiving nails for securing the sole plate to a horse's hoof, and said holes and nail heads are covered by said support plate when the horseshoe is secured on the horse's foot.

6. A horeseshoe as set forth in claim 1 in which said sole plate has an integral bar connecting opposite sides of the plate.

7. A horseshoe as set forth in claim 1 in which said support plate and said elastomeric ground plate have substantially flat faces in interfacial contact.

8. A horseshoe kit comprising at least one sole plate adapted to be nailed to a horse's hoof in direct contact with the hoof a cushioned base plate adapted for attachment to said sole plate for ground contacting purposes, said base plate comprising a support plate for securement to said sole plate and an elastomeric ground contact plate bonded to said support plate, said sole plate having tapped holes in it and said metal support plate having matching holes in it, and a plurality of headed threaded means for attaching said base plate to said sole plate after the sole plate is affixed to a horse's hoof and for quickly and easily changing base plates while said sole plate is affixed to a horse's hoof, said attachment of the base plate to the sole plate being entirely by securement of said support plate to said sole plate with said threaded means.

9. A kit as set forth in claim 8 in which said sole plate is made of non-metallic material.

10. A kit as set forth in claim 9 in which said sole plate has threaded metal inserts therein for receiving said threaded fastener means.

11. A kit as set forth in claim 8 in which said sole plate has a roughened surface for contacting a horse's hoof to help grip the hoof and reduce stress on the nails used to nail the plate to the hoof.

12. A kit as set forth in claim 8 in which said support plate is made of material selected from the group consisting of polymers, plastics, graphites and carbon fiber in resin base.

13. A horseshoe comprising a sole plate having holes in it for receiving nails to affix the plate to a horse's hoof in contact with the hoof a cushioned base plate adapted to be attached to said sole plate for ground contacting purposes and covering the heads of the nails which affix the sole plate to the hoof, with said base plate comprising a substantially flat support plate for attachment to said sole plate with a plurality of threaded means and an elastomeric ground plate having a flat upper surface bonded to said support plate.

14. A horseshoe as set forth in claim 13 which is adapted to have weights added thereto in the central part of the horseshoe.

15. A horseshoe as set forth in claim 13 in which said elastomeric ground plate comprises at least two sections that may be replaced individually.

* * * * *